July 23, 1935. H. J. SOMERS 2,008,800
FILTER
Filed Aug. 23, 1933
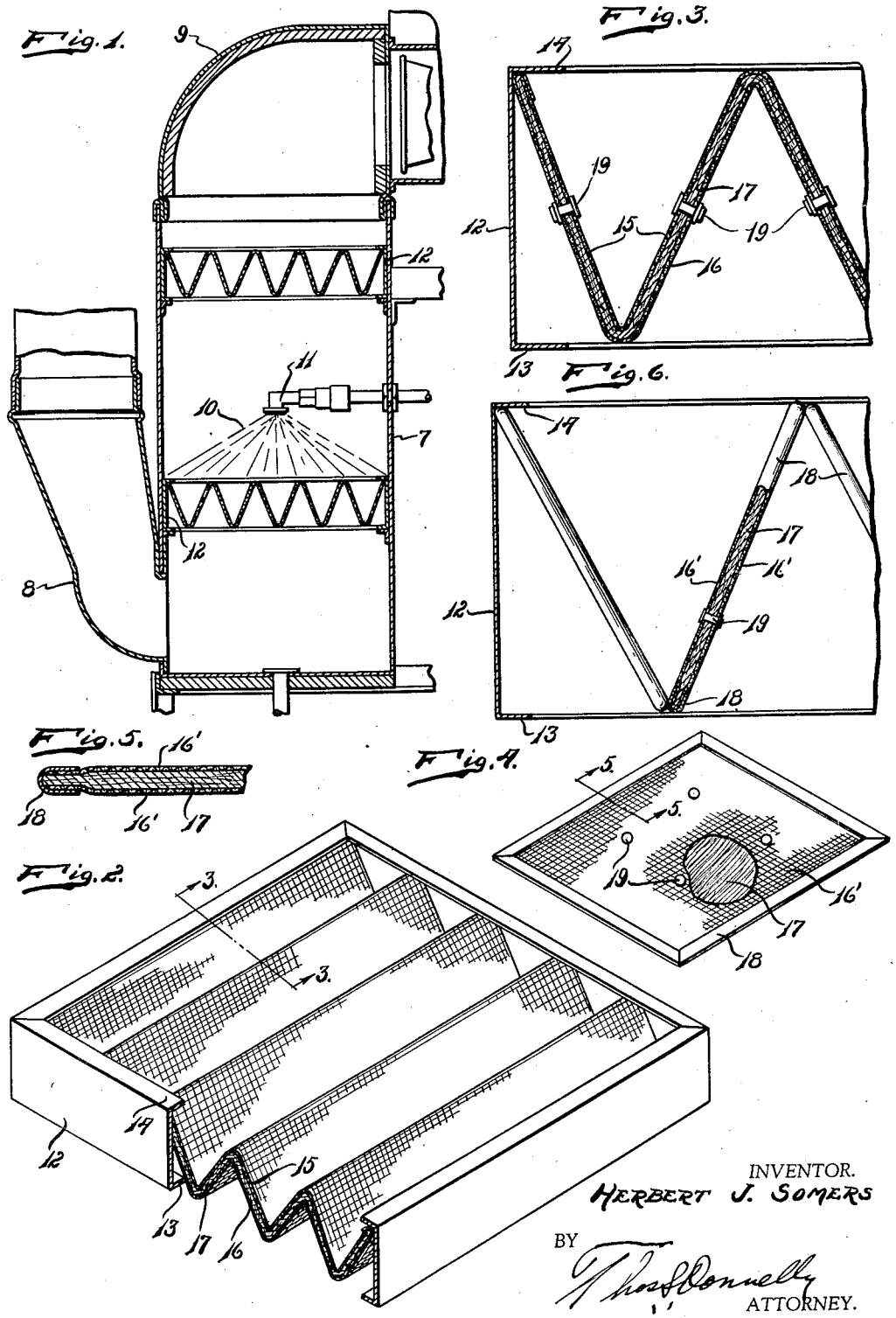
INVENTOR.
HERBERT J. SOMERS
BY Thos.J.Donnelly
ATTORNEY.

Patented July 23, 1935

2,008,800

UNITED STATES PATENT OFFICE 2,008,800

FILTER

Herbert J. Somers, Detroit, Mich.

Application August 23, 1933, Serial No. 686,384

2 Claims. (Cl. 183—71)

My invention relates to a new and useful improvement in a filter and particularly a filter adapted for filtering purposes generally, and primarily for air filtering.

It is an object of the present invention to provide a filter so arranged and constructed that the same will shed dust and particularly when mounted in a vertical position.

Another object of the invention is the provision of a filter formed from a pair of retaining foraminous layers enclosing a filter of filtering material formed preferably from spun glass.

Another object of the invention is the provision of a filter whereby a maximum area of filtering element may be presented in a predetermined opening.

Another object of the invention is the provision of a filter element substantially V shaped in cross section mounted in a suitable supporting frame.

Another object of the invention is the provision of a filtering element in which the maintenance cost will be reduced to a minimum and which may be easily and quickly cleaned.

Another object of the invention is the provision of a filtering element possessed of maximum efficiency.

Other objects will appear hereinafter.

The invention consists in the combination and arrangement of parts hereinafter described and claimed.

The invention will be best understood by a reference to the accompanying drawing which forms a part of this specification, and in which, Fig. 1 is a central sectional view of an air conduit showing the filtering element mounted in position and represented diagrammatically.

Fig. 2 is a perspective view of the filtering element with a part broken away.

Fig. 3 is a fragmentary sectional view taken on line 3—3 of Fig. 2.

Fig. 4 is a perspective view of a modified form of the invention.

Fig. 5 is a fragmentary sectional view taken on line 5—5 of Fig. 4.

Fig. 6 is a fragmentary sectional view of a further modified form of the invention.

In the drawing I have indicated a housing 7 leading into which is an air inlet conduit 8 and an outlet hood. Positioned slightly above the opening of the inlet conduit 8 is a filtering element against which a spray 10 of water is directed by the nozzle 11. Positioned above the nozzle 11 is another filter element. The filtering element comprises a retaining frame 12 formed of material channel shaped in cross section so as to provide the engagement flanges 13 and 14. The filtering element comprises the layers 15 and 16 of foraminous material. I prefer to use as these layers a wire cloth ranging from 200 mesh to 3 mesh. The standard application is No. 6 mesh. The filler or mat 17 formed from spun glass is positioned between and retained by the layers 15 and 16. When the No. 6 mesh is used in a standard application, the thickness of the mat may be 15/10000 of an inch to 5/1000 of an inch, and the entire thickness of the mat and wire cloth layers 15 and 16 ranges from 5/100 of an inch to 25/100 of an inch, and the layers 15 and 16 serve to prevent excessive wear on the mat or filler 17 and also serve to prevent a shifting of the filler or a matting of the same into lumps so that a filter element of great durability is provided.

In view of the fact that the spun glass is non-porous and non-absorbent, the cleaning of the filter element may be easily effected. This cleaning may be accomplished either by turning a hose onto the filter element or by using a vacuum cleaner thereon. In an installation such as shown in Fig. 1, the spray 10 will serve to retain the filter against which it is directed in a clean and sanitary condition. Furthermore, because of the nature of the filter element when the sides are extended vertically or at an inclination to the vertical, they will serve to shed dust so that an accumulation of dust on the filter element is reduced to a minimum.

With the use of the V shaped filter, the range of filter surface or projected area is 20 to 1, that is, the square feet of the filtering element may be increased to 20 times the square feet of the opening in which the element is positioned. The projected area of the filtering element is of course dependent upon the depth of the filtering element and the retaining frame is of such width or thickness as to accommodate the filtering element intended to be retained therein so as to snugly hold the same in position.

In Fig. 4, I have illustrated a filtering element of a flat type in which a retaining frame 18 which is U shaped in cross section embraces the edges of the wire cloth coverings 15' and 16' between which is engaged the filler or mat 17 of spun glass. Rivets 19 are projected through this filtering element at various positions so as to serve to bind the mat or filler in position and prevent its shifting within the wire coverings. Rivets 19 are also illustrated in Fig. 3 as used with the form illustrated therein.

In Fig. 6 I have indicated a V shaped filtering element formed from the flat filtering element shown in Fig. 4. In this form, the frame 12 is used and the flat filtering elements are positioned in an inclined position to provide the V shaped structure in cross section.

Experience has shown that this filtering element will serve to remove even sulphuric acid from moist air without material damage to the filtering element. In some applications, the filtering element is sprayed with a viscous oil, while in other applications the filtering element is assembled in a non-coated or dry condition.

It is obvious that the filtering element when mounted in the retaining frame as illustrated may be easily and quickly installed in position and removed and replaced.

While I have illustrated and described the preferred forms of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. A filter of the class described comprising a rigid frame having oppositely disposed walls; a filter element retained in said frame and comprising a pair of foraminous covering members; a filler of filter material between said covering members, said covering members being arranged in sinuous formation and engaging at opposite edges the inner faces of oppositely disposed walls of said frame; and an inwardly projecting flange on the opposite edge of each of said walls for overlying and engaging said filtering element.

2. A filter of the class described, comprising; a rigid frame having oppositely disposed walls; a filter element retained in said frame and engaging at its opposite edges and its opposiite ends the inner surface of said walls and comprising a pair of foraminous covering members; a filler of filter material between said covering members; and an inwardly projecting flange on each end of each of said walls, lying in engagement with the outer faces of said covering members; and securing means projecting through said covering members and said filter for preventing matting of the same.

HERBERT J. SOMERS.